US008281167B2

(12) United States Patent
Nakamura et al.

(10) Patent No.: US 8,281,167 B2
(45) Date of Patent: Oct. 2, 2012

(54) ELECTRONIC CONTROL APPARATUS PROVIDED WITH PLURAL MICROCOMPUTERS FOR ELECTRONICALLY CONTROLLING ELECTRONIC DEVICES MOUNTED IN VEHICLE

(75) Inventors: Michio Nakamura, Toyoake (JP); Toru Itabashi, Anjo (JP)

(73) Assignee: Denso Corporation, Kariya (JP)

( * ) Notice: Subject to any disclaimer, the term of this patent is extended or adjusted under 35 U.S.C. 154(b) by 640 days.

(21) Appl. No.: 12/351,186

(22) Filed: Jan. 9, 2009

(65) Prior Publication Data

US 2009/0183018 A1 Jul. 16, 2009

(30) Foreign Application Priority Data

Jan. 11, 2008 (JP) ................. 2008-004442

(51) Int. Cl.
*G06F 17/00* (2006.01)
*B60K 1/00* (2006.01)
*H02J 7/14* (2006.01)
*H04B 1/16* (2006.01)
*B60R 3/00* (2006.01)

(52) U.S. Cl. ........... 713/320; 701/48; 701/36; 180/65.1; 320/104; 455/209; 307/9.1

(58) Field of Classification Search .............. 701/48, 701/36; 180/65.1; 320/104; 455/209; 307/9.1
See application file for complete search history.

(56) References Cited

U.S. PATENT DOCUMENTS

2005/0033494 A1* 2/2005 Harada et al. ............. 701/36
2006/0276947 A1* 12/2006 Kaita et al. ............... 701/48
2007/0194748 A1* 8/2007 Yamaguchi ............... 320/104
2009/0081976 A1* 3/2009 Fujii et al. ................ 455/209
2009/0145674 A1* 6/2009 Lee et al. ................. 180/65.1
2009/0326767 A1* 12/2009 Kamada et al. ............. 701/48
2010/0308647 A1* 12/2010 Fluhrer et al. ............. 307/9.1

FOREIGN PATENT DOCUMENTS

| JP | 63-101147 | 5/1988 |
| JP | 07-325788 | 12/1995 |
| JP | 10-297395 | 11/1998 |
| JP | 2000-276267 | 10/2000 |
| JP | 2007-030593 | 2/2007 |
| JP | 2007-213137 | 8/2007 |

OTHER PUBLICATIONS

Japanese Office Action dated Nov. 17, 2009, issued in corresponding Japanese Application No. 2008-004442, with English translation.

* cited by examiner

*Primary Examiner* — Chun Cao
*Assistant Examiner* — Aurel Prifti
(74) *Attorney, Agent, or Firm* — Nixon & Vanderhye P.C.

(57) ABSTRACT

In an electronic control apparatus for vehicles, there is provided a main microcomputer activated when a given activation condition is met and a sub-microcomputer to which a power control signal controlling power supply to the sub-microcomputer is supplied. A first power supply unit supplies, via a first supply line, power supply voltage to the main microcomputer for activation, and a second power supply unit supplies, via a second supply line different from the first supply line, power supply voltage to the sub-microcomputer for activation when the sub-microcomputer receives the power control signal. The main microcomputer determines whether or not the sub-microcomputer should be made to operate and performs a switchover between output and non-output of the power control signal to the second power supply unit based on the determined results, whereby the power supply to the sub-microcomputer is controlled.

21 Claims, 5 Drawing Sheets

ELECTRONIC CONTROL APPARATUS PROVIDED WITH PLURAL MICROCOMPUTERS FOR ELECTRONICALLY CONTROLLING ELECTRONIC DEVICES MOUNTED IN VEHICLE

CROSS-REFERENCE TO RELATED APPLICATION

This application is based on and claims the benefit of priority from earlier Japanese Patent Application No. 2008-004442 filed Jan. 11, 2008, the description of which is incorporated herein by reference.

BACKGROUND OF THE INVENTION

1. Technical Field of the Invention

The present invention relates to an electronic control apparatus for vehicles, and in particular, to the electronic control apparatus provided with plural computers for electronically controlling electronic devices mounted in vehicles.

2. Related Art

In recent years, electronic devices mounted in a vehicle are mostly controlled by in-vehicle electronic control apparatuses. These electronic control apparatuses have been on the increase in their capability, in which it is frequent that they are provided with a plurality of microcomputers that collaborate with each other in performing objective control actions.

In the foregoing electronic control apparatus, it is also possible to employ the scheme that the apparatus takes a waiting state to wait for realization of a pre-given activation condition assigned to the apparatus during the off state of the vehicle ignition switch. In this case, when it is detected that the activation condition has been met, the apparatus is shifted to its normal operation state. It is required for the microcomputer that the waiting mode should consume power less than the normal operation mode, because of, in no small part, saving the power consumption of the battery. This requirement helps the battery avoid deterioration in the engine startability and prevents the battery from running out.

In consideration of such situations, Japanese Patent Laid-open Publication No. 2007-30593 discloses an electronic control apparatus with two microcomputers. In this control apparatus, a power supply voltage is supplied from a power supply IC to the two microcomputers via a common power line. In addition, when the two microcomputers both output sleep allowing signals to the power supply IC, the power supply IC stops outputting the power supply voltage to both microcomputers. Namely, in this configuration, the power supply IC is in charge of waking up and sleeping the two microcomputers at the same time.

In the above apparatus configuration, both microcomputers can be slept only when the sleep allowing signals from the two microcomputers meets a logical AND condition. Hence, there are provided only two states composed of a first state where the two microcomputers are stopped from operating and a second state where the two microcomputers operate. This means that, if one of the two microcomputers is designated as a main microcomputer and the other is designated as a sub-microcomputer, it is impossible to provide a third state where only the main microcomputer operates while the sub-microcomputer stops. Hence, it is impossible to selectively activate only one microcomputer which is necessary depending on vehicle control situations. This frequently results in unnecessary consumption of the power.

In order to obtain the third state, the person skilled in the art may conceive of a configuration where a reset signal is continuously supplied to the sub-microcomputer for stopping the sub-microcomputer, resulting in the operation of only the main microcomputer. However, in this configuration, both of the sub and main microcomputers are powered continuously. Hence, the power is consumed uselessly by circuit components such as a pull-up resistor and a pull-down resistor incorporated in the sub-microcomputer. As a result, it is not sufficient in saving the power consumption. Moreover, in the above conventional apparatus, another difficulty cannot be avoided, which concerns, for example, a malfunction which may occur in the sub-microcomputer. Practically, if such a malfunction occurs, it is probable that the sub-microcomputer cannot output the sleep allowing signal. If this happens, the apparatus itself no longer reduces the power consumption.

SUMMARY OF THE INVENTION

The present invention has been made in consideration of the above-stated situations, and it is an object of the present invention to provide an electronic control apparatus for vehicles, which is capable of reducing the power consumption although the apparatus is provided with a plurality of microcomputers for the control.

In order to achieve the above object, the present invention provides as one aspect an electronic control apparatus for vehicles, comprising a main microcomputer which is activated when a given activation condition is met; a sub-microcomputer to which a power control signal is supplied, the power control signal controlling power supply to the sub-microcomputer; a first power supply unit that supplies, via a first supply line, power supply voltage to the main microcomputer to activate the main microcomputer; and a second power supply unit that supplies, via a second supply line different from the first supply line, power supply voltage to the sub-microcomputer to activate the sub-microcomputer, when the sub-microcomputer receives the power control signal. In this configuration, the main microcomputer includes determining means for determining whether or not the sub-microcomputer should be made to operate and switching means for performing a switchover between output and non-output of the power control signal to the second power supply unit based on results of the determining means whereby the power supply to the sub-microcomputer is controlled.

That is, when it is determined that the sub-microcomputer is made to operate, the main microcomputer provides the second power supply unit with the power control signal, so that the second power supply unit is able to supply the operating power supply voltage to the sub-microcomputer. Hence, the sub-microcomputer is made to operate. In contrast, when it is determined the sub-microcomputer is made not to operate, the output of the power control signal is stopped. In this case, the second power supply unit is not allowed to supply the operating power supply voltage to the sub-microcomputer, thereby stopping the operations thereof. From a viewpoint of operating time, it can be described that the main microcomputer is designated as a microcomputer whose control working time is longer than that of the sub-microcomputer.

In this way, the electronic control apparatus according to the present invention is able to have three states composed of a first state where both of the main and sub microcomputers are stopped from operating, a second state where only the main microcomputer operates (while the sub-microcomputer stops to operate), and a third state where both of the main and sub microcomputers operate.

That is, depending on control situations, only necessary microcomputer can be operated, thus avoiding useless power consumption which is nothing to do with the control work, thus increasing the efficiency of the power consumption. A further advantage is that, when only the main microcomputer is allowed to operate, the sub-microcomputer will not be powered with the operating power supply voltage. This avoids power from being consumed uselessly in the sub-microcomputer, further improving the efficiency of power consumption.

It is preferred that, in the above apparatus, the first power supply unit includes means for receiving a further power control signal controlling power supply to the main microcomputer and means for switching an operation mode of the operating power supply voltage to the main microcomputer from a low-power output mode enabling a small amount of power to be outputted to a high-power output mode enabling a high amount of power to be outputted higher than the small amount of power; and the main microcomputer includes means for operating in a waiting mode with power consumed less than in a normal operation mode of the main microcomputer, depending on the operating power supply voltage from the first power supply unit operating in the low-power output mode, until the determining means determines that the activation condition has been met, and means for outputting the further power control signal to the first power supply unit when it is determined that the activation condition has been met in the waiting mode, allowing the first power supply unit to transit from the waiting mode the normal operation mode.

In this configuration, it is not necessary to arrange an separate circuit to sense the establishment of completion of the activation condition and to activate the main microcomputer in response to the sensing. Thus the apparatus can be made compact. In addition, when the main microcomputer is under the waiting mode, the power consumed by first power supply unit can be reduced, because the first power supply unit keeps the low-power output mode. This reduction in the power consumption can be advantageous over a circuit supplying the power to the conventional microcomputer. In such a circuit (corresponding to the first and second power supply units), a voltage step-down type regulator is employed which steps down the battery voltage (i.e., the voltage of an on-vehicle battery) to a given value. In this regulator, in order to increase the amount of output power, it is needed to increase drive current to an output transistor. This large drive current results in increasing the power consumption. In contrast, the present invention commands the low-power output mode to the first power supply unit, reducing the power consumption in the first power supply unit.

It is also preferred that the sub-microcomputer includes monitoring means for monitoring whether or not the main microcomputer is in a normal operation. This provides reliability to the apparatus. When the main microcomputer is able to monitor the operations of the sub-microcomputer, it is possible to perform mutual monitoring between the main and sub microcomputers, increasing the reliability of the apparatus.

The remaining features and advantages of the present invention can be read from the following description which is accompanied by the drawings.

DETAILED DESCRIPTION OF THE PREFERRED EMBODIMENTS

Referring to the accompanying drawings, various embodiments of an electronic control apparatus for vehicles, which is according to the present embodiment, will now be described.

First Embodiment

Figure 1:
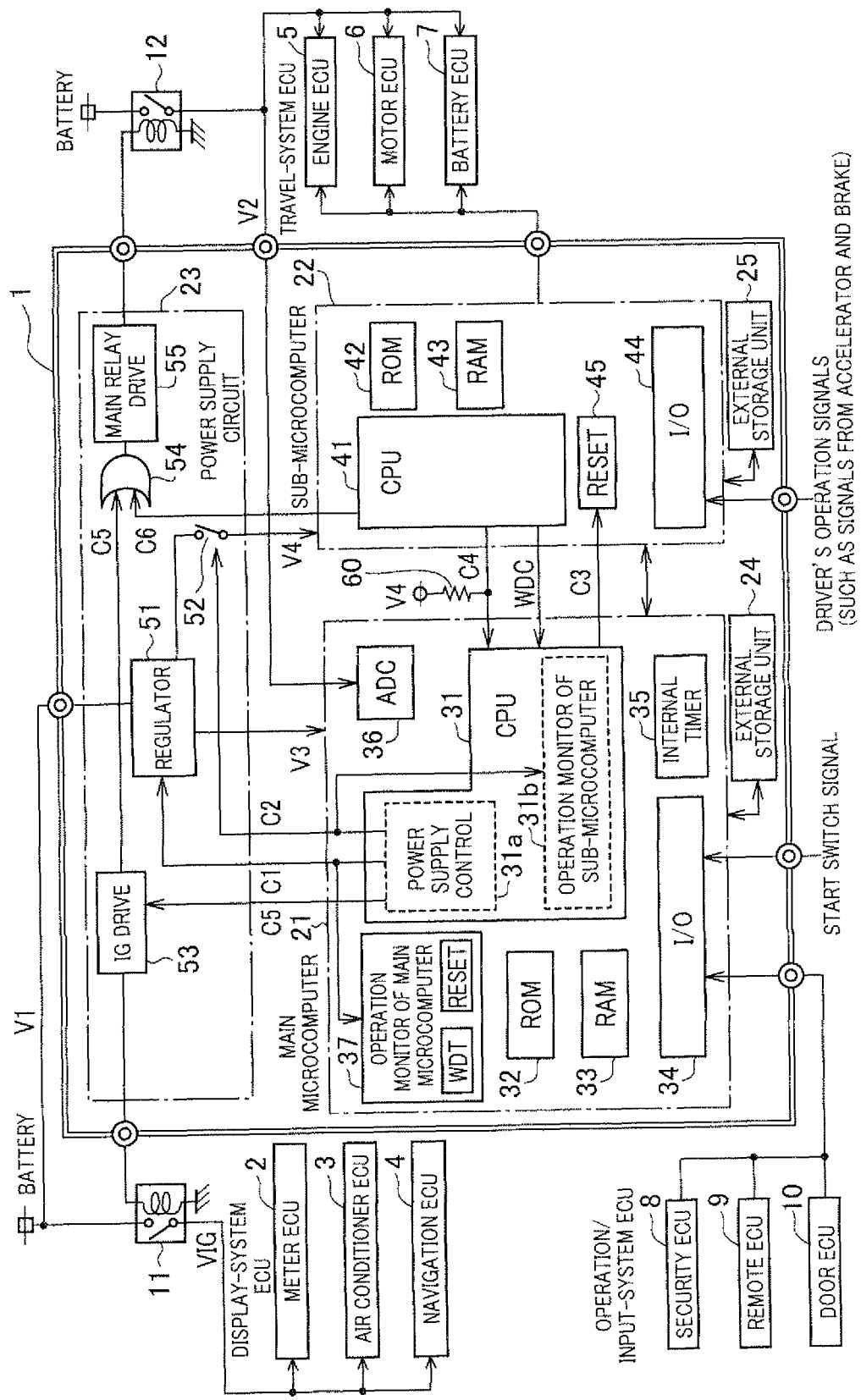
FIG. 1 is a block diagram showing the configuration of an electronic control apparatus (practically, an electronic control unit) for vehicles, according to a first embodiment of the present invention.
Figure 2:
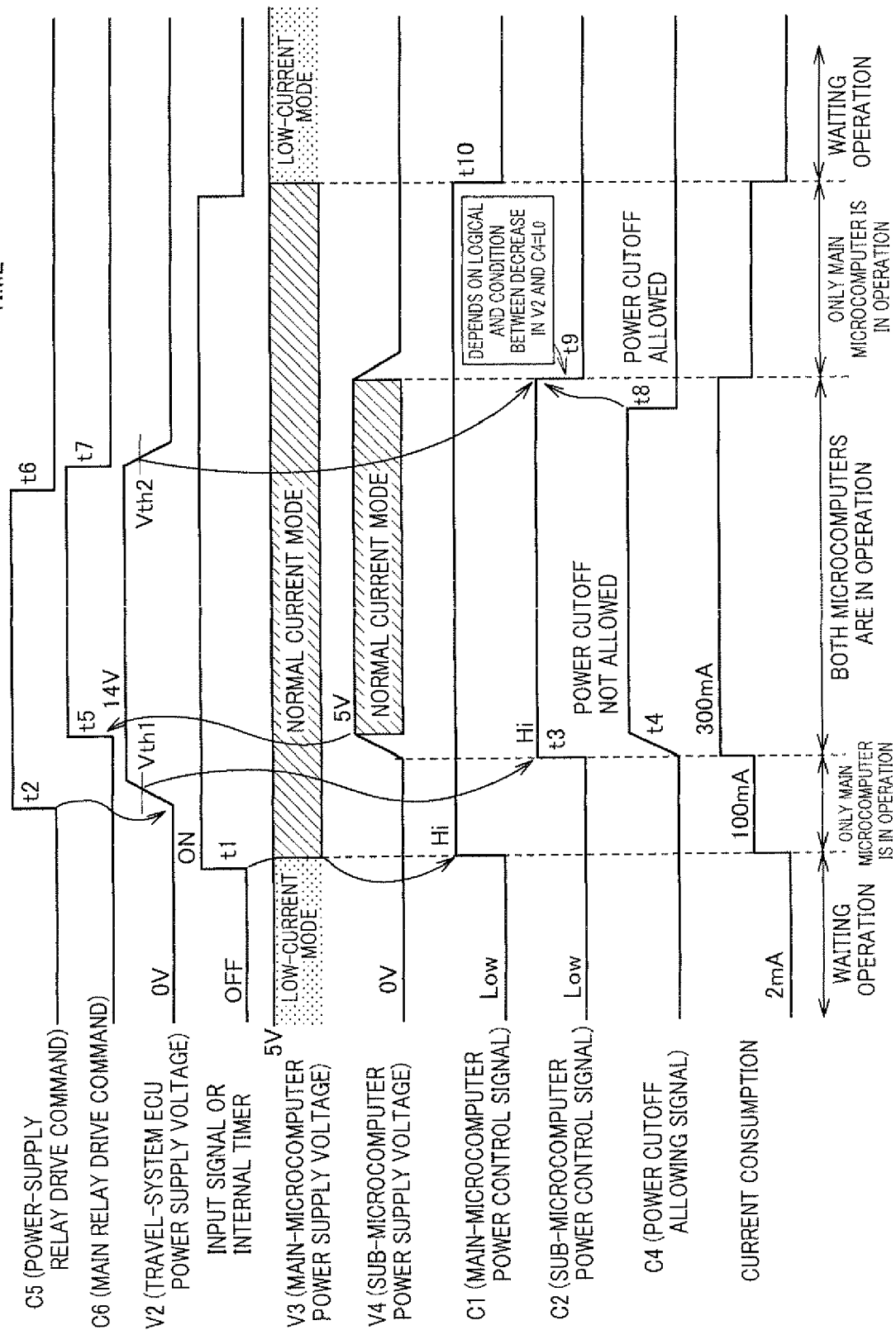
FIG. 2 is a first timing chart for explaining the operations of the electronic control apparatus in the first embodiment.
Figure 3:
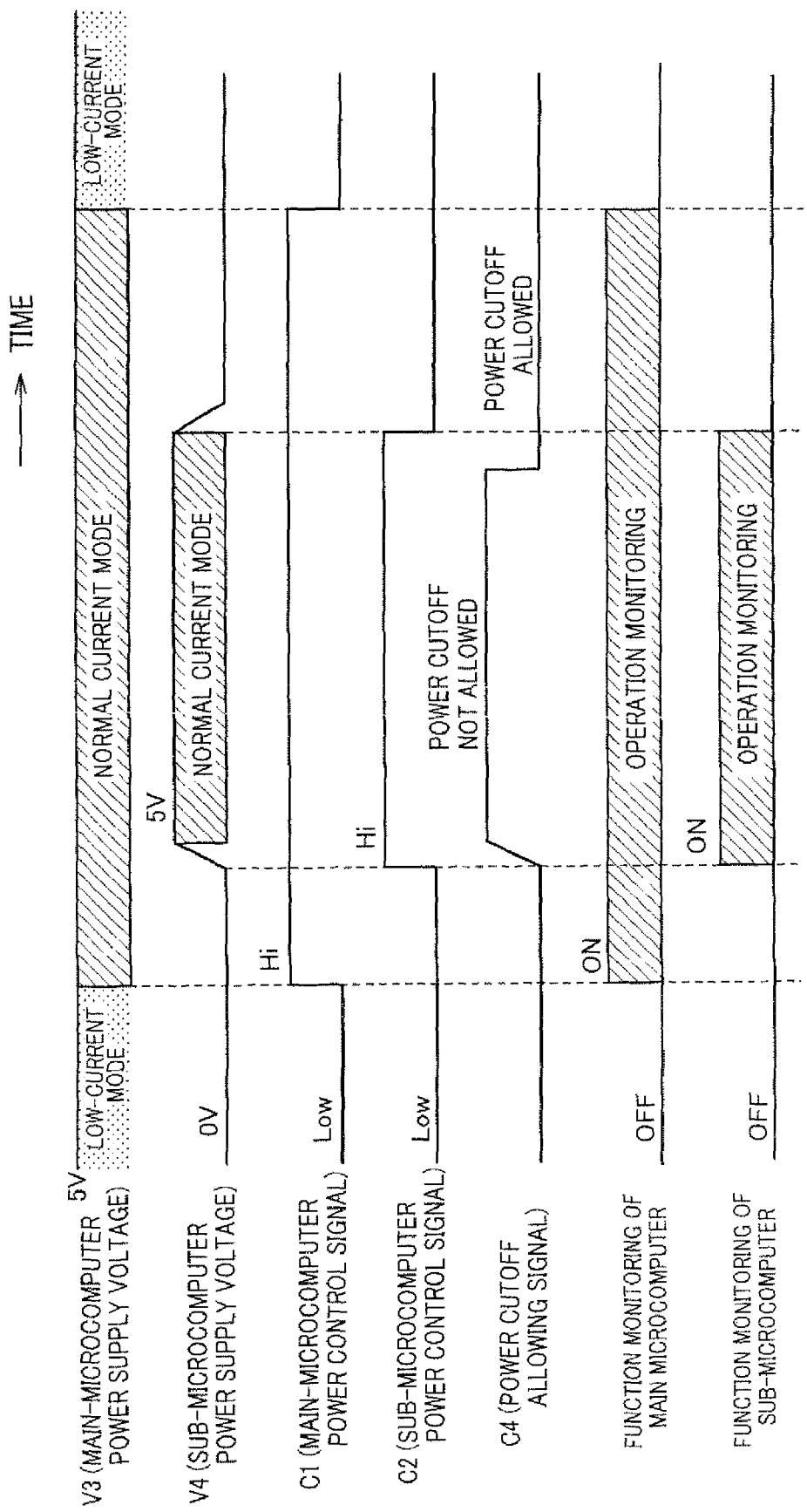
FIG. 3 is a second timing chart for explaining the operations of the electronic control apparatus in the first embodiment.

Referring to FIGS. 1-3, a first embodiment of the electronic control apparatus according to the present invention will now be described.

FIG. 1 shows an ECU (electronic control unit) 1 according to the first embodiment. This ECU 1 composes the electronic control apparatus of the present invention.

The ECU 1 is operable on the voltage V1 of an on-vehicle battery (simply, battery voltage). This ECU 1 has a function of supplying an ignition-system (i.e., ignition-relating) power supply voltage VIG to display-system (i.e., display-relating) ECUs such as a meter ECU 2, an air conditioner ECU 3, and a navigation ECU 4, a function of supplying a power supply voltage V2 to travel-system (i.e., travel-relating) ECUs such as an engine ECU 5, a motor ECU 6, and a battery ECU 7, and a function of controlling the motive power of the vehicle by controlling the travel-system ECUs 5-7 under communication.

Among the above ECUs, the meter ECU 2 controls various meters mounted on the vehicle. The air conditioner ECU 3 controls an air conditioner installed in the vehicle and the navigation ECU 4 controls a navigation system installed in the vehicle. To those display-system ECUs 2-4, the battery voltage V1 is supplied as the power supply voltage VIG via an ignition (IG) relay 11 which can be turned on by the ECU 1.

The engine ECU 5 is installed as an ECU to control an internal combustion engine mounted in the vehicle. The motor ECU 6 is in charge of controlling an electric motor that generates the motive power given to the vehicle together with the engine. Further, the battery ECU 7 controls the charge and discharge of an in-vehicle battery which serves as a power supply to the vehicle. To those travel-system ECUs 5-7, the battery voltage V1 is supplied as a power supply voltage V2 via a main relay 12 which can be turned on by the ECU 1. These travel-system ECUs 5-7 are configured to control respective objects to be controlled, on the basis of commands issued from the ECU 1 and/or target values given in each control action.

In addition, the ECU 1 is configured to communicate with operation/input-system ECUs including a security ECU 8, a remote ECU 9, and a door ECU 10, so that it is possible to acquire operative information given from the crew to the vehicle. Further, the ECU 1 is able to receive a start switch signal indicting the on/off states of a push type of start switch operated by the driver to command the start/stop of the ignition-system power supply and the start of the engine, as well as a signal (driver's operation signal) indicating the operated states of an accelerator and a brake to operated by the driver.

The security ECU 8 performs control for protecting the vehicle against theft. The remote ECU 9 is a control unit which communicates with a remote key brought with the driver when the remote key comes closer to the vehicle. Further, the door ECU 10 detects the open/close actions of the doors of the vehicle and controls various door-related control devices such as actuators for door lock and electric motors for power windows. Accordingly, from the operation/input-system ECUs 8-10 to the ECU 1, a signal showing the open action of a door, a signal showing that communication has been made with the remote key, data to be referred which have been sent from the remote key, and bits of other information are sent.

As shown in FIG. 1, the ECU 1 is provided with a main microcomputer 21, a sub-microcomputer 22, and a power supply circuit 23 to supply operating constant power-supply voltages V3 and V4 to the microcomputers 21 and 22 for operation thereof. The microcomputers 21 and 22 are electrically connected to nonvolatile external storage units 24 and 25 respectively, which are composed of for example EEPROMs.

The main microcomputer 21, which is required to operate even in the off state of the ignition switch, is mainly in charge of controlling power supply to the display-system ECUs 2-4 and the travel-system ECUs 5-7 as well as power supply to the sub-microcomputer 22.

The main microcomputer 21 has known components and a main microcomputer operation monitor 37. The known components include a CPU 31 to execute given software programs, a ROM 32 to store those programs, a RAM 33 into which data showing results calculated by the CPU 31 are temporarily stored, an I/O port 34, an internal timer 35, an A/D converter (ADC) 36. The main microcomputer operation monitor 37 is constructed to monitor whether or not the main microcomputer 21 itself is in normal operation. The I/O port 34 has a function of receiving various switch signals, such as a start switch signal, and also a function of sensing signals to be sent via communication lines from the operation/input-system ECUs 8-10. Although not shown in FIG. 1, the main microcomputer 21 is also provided with a communication control circuit to communicate with the operation/input-system ECUs 8-10.

Additionally, in the main microcomputer 21, the CPU 31 executes the programs stored in the ROM 32, which functionally realizes a power supply controller 31*a* which controls power supply to the other ECUs 2-7 and the sub-microcomputer 22 and a sub-microcomputer operation monitor 31*b* which monitors whether or not the sub-microcomputer 22 is in normal operation.

The sub-microcomputer 22 is able to transmit and receive information to and from the main microcomputer 21 via an internal communication line and to communicate with the travel-system ECUs 5-7 for control. Like the main microcomputer 21, the sub-microcomputer 22 has known components and a reset circuit 45. The known components include a CPU (central processing unit) 41 executing given software programs, a ROM (read-only memory) 42 storing the programs, a RAM (random access memory) 43 which is able to temporarily store results calculated by the CPU 41, and an I/O port 44. Meanwhile the reset circuit 45 which can receive a reset signal C3 sent from the main microcomputer 21 in order to reset the sub-microcomputer 22. Though not shown in FIG. 1, the sub-microcomputer 22 has a communication control circuit to control communication with the travel-system ECUs 5-7.

The sub-microcomputer 22 is monitored by the main microcomputer 21. To perform this monitoring, the sub-microcomputer 22 is configured to output a watch dog carrier signal WDC to the main microcomputer 21 at regular intervals. This watch dog clear signal WDC is outputted whenever the CPU 41 of the sub-microcomputer 22 executes a specific command incorporated in the programs at the regular intervals.

The power supply circuit 23 contains the regulator 51 that steps down the battery voltage V1 constantly supplied from the battery to produce both the operating power supply voltage V3 and the operating power supply voltage V4. Of these voltages, the operating power supply voltage V3 is a constant voltage for operating the main microcomputer 21, which is 5 V in the present embodiment (hereinafter referred to as a main microcomputer power supply voltage or simply power supply voltage). In contrast, the operating power supply voltage V4 is a constant voltage for operating the sub-microcomputer 22, which is 5 V in the present embodiment (hereinafter referred to as a sub-microcomputer power supply voltage or simply power supply voltage).

The regulator 51 is configured to output, of the two-system power supply voltages V3 and V4, only the main-microcomputer power supply voltage V3, in cases where the main microcomputer 21 does not output a main-microcomputer power control signal C1 to the power supply circuit 23. In this case, the operation mode to output the power supply voltage V3 is set to a low-power output mode under which the amount of power to be outputted is low (i.e., current which can be outputted is low). When being set to this low-power output mode, the amount of power outputted at the power supply voltage V3 is limited to a minimum amount of power with which both the I/O port 34 and the internal timer 35 in the main microcomputer 21 are operable.

In contrast, in the case where the main microcomputer 21 outputs the main-microcomputer power control signal C1 to the power supply circuit 23, the regulator 51 operates to output both the power supply voltages V3 and V4 and sets the operation mode to a high-power output mode under which the amount of power to be outputted is large. That is, under this high-power output mode, the amount of power outputted at the main-computer power supply voltage V3 becomes an amount which is able to operate all the components in the main microcomputer 21.

Additionally the power supply circuit 23 contains a switch 52, which is able to respond to a sub-microcomputer power control signal C2 sent from the main microcomputer 21 to the power supply circuit 23. Specifically, the switch 52 is turned on when the power control signal C2 is supplied from the main microcomputer 21 to the power supply circuit 23, resulting in that the sub-microcomputer power supply voltage V4 outputted from the regulator 51 to the sub-microcomputer V4.

The switch 52 can be modified such that the power supply voltage V3 outputted from the regulator 51 is supplied as the sub-microcomputer power supply voltage V4 to the sub-microcomputer 22. In this case, it is sufficient that the amount of power outputted at the power supply voltage V3 in the high-power output mode of the regulator 51 is set to a power amount which makes it operable all the components in both the main microcomputer 21 and the sub-microcomputer 22.

The power supply circuit 23 additionally contains an IG drive circuit 53, a logical addition (OR) circuit 54, and a main relay drive circuit 55. Of these, the IG drive circuit 53 is configured to turn on an IG relay 11 in response to reception of a power-supply relay drive command C5 from the main microcomputer 21. The OR circuit 54 outputs a logical addition signal of both the power-supply relay drive signal C5 and a main relay drive command C6 outputted from the sub-microcomputer 22. The main relay drive circuit 55 is configured to turn on a main relay 12 in cases where the logical addition output of the OR circuit 54 is at an active level (that is, in either case when the main microcomputer 21 outputs the power-supply relay drive command C5 or when the sub-microcomputer 22 outputs the main relay drive command C6).

Additionally, in the present ECU 1, the sub-microcomputer 22 has the capability of outputting a power cutoff allowing signal C4 to the main microcomputer 21, when the sub-microcomputer 22 determines that its operations can be stopped. This power cutoff allowing signal to C4 is a port signal outputted from an output port of the sub-microcomputer 22. A signal line from the output port, which is in charge of transmitting the signal C4, to the main microcomputer 21 is electrically connected via a resistor 60 to a non-active voltage which represents no permission of the power supply cutoff. In the present embodiment, this non-active voltage is a high-level voltage composed of the sub-microcomputer power supply voltage V4 outputted from the switch 52 of the power supply circuit 23 to the sub-microcomputer 22. Hence the signal line for the power cutoff allowing signal C4 is always pulled up to the high level, i.e., the sub-microcomputer power supply voltage V4, via the resistor 60.

Referring to FIG. 2, the ECU 1 will now be described in its operations.

In a state before a time instant t1, where the battery voltage V1 is simply powered to the ECU 1, the main microcomputer 21 is in a waiting mode in which only the I/O port 34 and the internal timer 35 are operating. In this waiting mode, neither the main-microcomputer power control signal C1 nor the sub-microcomputer power control signal C2 are not supplied from the main microcomputer 21. In the present embodiment, since being set to be high-active signals, the control signals C1 and C2 are kept at their low levels in the waiting mode.

Hence, the power supply voltage V4 is not supplied from the power supply circuit 23 to the sub-microcomputer 22 (i.e., V4=0V). In this case, the power supply voltage V3 is supplied from the power supply circuit 23 to the main microcomputer 21, where the operation mode of the regulator 51 outputting this power supply voltage V3 is set to the foregoing low-power output mode (in FIG. 2, denoted as "low current mode"). As a result, the sub-microcomputer 22 is in a stop state without consuming power at all, while the main microcomputer 21 allows both the I/O port 34 to sense the realization of activation conditions and the internal timer 35 to operate, with the power consumption limited to its minimum amount. In addition, the power consumption at the regulator 51 is also limited to its minimum amount. These states of the components 22, 21 and 51 realize the waiting state of the ECU 1 and, as shown in the bottom of FIG. 2, current consumed by the entire ECU 1 in the waiting state (that is, dark current) is approximately 2 mA, for example.

At the time instant t1, the signal(s) is sent from the operation/input-system ECUs 8-10 to the ECU 1 or any switch signal such as a start switch signal given to the ECU 1 changes to its active level. In this case, a given activation condition is met, which is sensed by the I/O port 34. In response to this sensing, the main microcomputer 21 outputs the main-microcomputer power control signal C1 to the power supply circuit 23.

In response to the output, the regulator 51 in the power supply circuit 23 changes its operation mode from the lower-power output mode to the high-power output mode (in FIG. 2, denoted as "normal current mode") and the main microcomputer 21 shifts its operation mode from the waiting mode to a normal operation mode which allows all the components to operate. In this normal operation mode, the CPU 31 executes given programs to perform the control actions to be assumed by the main microcomputer 21.

Incidentally, in the normal operation mode, of both microcomputers 21 and 22, only the main microcomputer 21 operates, so that as shown in the bottom of FIG. 2, the power consumed by the entire ECU 1 becomes approximately 100 mA. The activation condition for the main microcomputer 21 includes a condition showing reception of a signal from the operation/input-system ECUs 8-10 or a switch signal, and may include, for example, a condition showing completion of counting a stop interval by the internal timer 35.

When the main microcomputer 21 is brought into its normal operation mode from the waiting mode, the main microcomputer 21 uses the received signal, that is, the signal coming form the ECUs 8-10 or the signal coming from the external various switches, to determine whether or not an ignition-on condition is met. This ignition-on condition is a criterion for determining whether or not an ignition-system power supply in the vehicle should be powered on.

By way of example, when a user's specific operation at the start switch is detected using the start switch signal and verification data from the remote key, which is received from the remote ECU 9, is authenticated as showing a qualified user's remote key, it is determined that the ignition-on condition is met.

In contrast, when it is not determined that the ignition-on condition is not met now, the main microcomputer 21 executes appropriate processes in accordance with the contents of the received signal, before stopping the output of the main-microcomputer power control signal C1. The main microcomputer 21 returns to the waiting mode from the normal operation mode.

Meanwhile, at a time instant t2, when being determined that the ignition-on condition is met, the main microcomputer 21 provides the power supply circuit 23 with the power-supply relay drive command C5 of a high level (i.e., active level).

In response to the reception of this command C5, the ignition drive circuit 53 enables the IG relay 11 to turn on, with the result that the power supply voltage VIG, i.e., the ignition-system power supply, is given to the display-system ECUs 2-4. The power-supply relay drive command C5 from the main microcomputer 21 is also given to the main relay drive circuit 55 via the IG drive circuit 53 and the OR circuit 54, thus allowing the circuit 55 to turn on the main relay 12. Hence, the power supply voltage V2 is also applied to the travel-system ECUs 5-7 which are under the control of the sub-microcomputer 22.

In addition, the main microcomputer 21 starts to monitor, via the A/D converter 36, the power supply voltage V2 to be supplied to the travel-system ECUs 5-7 via the main relay 12. The main microcomputer 21 decides that the sub-microcomputer 22 should to start at a time instant t3 at which it is determined by the main microcomputer 21 that the power supply voltage V2 to the travel-system ECUs 5-7 is continuously equal to or higher than a given threshold Vth1 for a given period of time. This determination means that the ignition-on condition has been met and the power supply voltage V2 has been supplied to the travel-system ECUs 5-7 securely. In this case, at the time instant t3, the sub-microcomputer power control signal C2 is outputted to the power supply circuit 23.

In response to this output of the power control signal C2, the power supply voltage V4 is given from the power supply circuit 23 to the sub-microcomputer 22, whereby the sub-microcomputer 22 can be activated. The foregoing threshold Vth1 is set to a voltage which makes the travel-system ECUs 5-7 operable in a reliable manner.

In this way, after the power supply voltage V2 has been supplied to the travel-system ECUs 5-7, the power supply voltage V4 is supplied to the sub-microcomputer 22. On completion of starting the supply of the voltage V4, the state where both the microcomputers 21 and 22 are in operation is finally realized. In this operation state, as shown in the bottom of FIG. 2, the amount of current consumed by the entire ECU 1 is for example approximately 300 mA. When the power supply voltage V4 is supplied to the sub-microcomputer 22, its CPU 41 starts to execute given programs so that the CPU 41 is in charge of performing the control to be assumed by the sub-microcomputer 22.

In response to starting the actions of the sub-microcomputer 22 at the time instant t4, the power cutoff allowing signal C4 to the main microcomputer 21 is set to its high level which is non-active level (i.e., the power cutoff is not permitted). At a time instant t5, the sub-microcomputer 22 outputs to the power supply circuit 23 the main relay drive command C6 of high level (i.e., active). Outputting this command C6 is for continuously keeping the on state of the main relay 12 even when the power-supply relay drive command C5 from the main microcomputer 21 falls down to its low level.

After this, using driver's operation signals given from outside the ECU 1, the sub-microcomputer 22 engages in detection of driver's operations done at the accelerator pedal and the brake pedal. The sub-microcomputer 22 uses the detected results to calculate a target value of torque to be outputted from each of the engine and the electric motor as well as a target value of the amount of battery charging to be performed, and outputs those calculated targets to the ECUs 5-7. Accordingly, each of the ECUs 5-7 controls the operations of each object to be controlled (i.e., the engine, electric motor, battery charger, and others) based on the calculated target values.

In cases where, at a time instant t7, the sub-microcomputer 22 detects a state where the travel-system ECUs 5-7 do not need to be controlled any more (practically, a state where the motive power of the vehicle can be stopped), the main relay drive command C6 is stopped from being outputted.

For example, the sub-microcomputer 22 may use information given from the main microcomputer 21 to detect the fact that the driver has operated the start switch to issue a command indicating the cutoff of the ignition-system power supply (for example, a push operation twice during a given period of time). In this example, a command to stop the control actions is transmitted to the ECUs 5-7. It is then determined whether or not all the ECUs 5-7 have completed their processes, and when such a determination can be made, it is recognized that the ECUs 5-7 have been released from their control processes.

By the way, when it is detected at a time instant t6 that the driver has operated the start switch to issue a command indicating the cutoff of the ignition-system power supply, the main microcomputer 21 immediately stops the power-supply relay drive command C5 from being outputted. Thus, at the time instant t6, this drive command C5 falls down to its low level before the main relay drive command C6 is stopped by the sub-microcomputer 22. In answer to this output stop of the drive command C6, the main relay 12 is turned off, so that the travel-system ECUs 5-7 are cut off from being powered.

After this, the sub-microcomputer 22 continuously writes, into the external storage unit 25, data such as learned values to be preserved and results of failure diagnosis even when its operations are now in the stop state. On completion of writing in such data at a time instant t8, the sub-microcomputer 22 determines that the sub-microcomputer t8 itself is not required to perform the control actions and outputs the power cutoff allowing signal C4 to the main microcomputer 21. That is, the level of this signal C4 is turned to its active low level side.

Meanwhile, the main microcomputer 21 determines if or not the power supply voltage V2 applied to the travel-system ECUs 5-7 is continuously equal to or less than a given threshold Vth2 for a given period of time and the power cutoff allowing signal C4 coming from the sub-microcomputer 22 is in its low level. If such a logical AND condition is met at a time instant t9, the sub-microcomputer power control signal C2 is stopped to be outputted to the power supply circuit 23. The foregoing threshold Vth2 is set in advance to a value which will cause the travel-system ECUs 5-7 to be inoperative.

Hence, the power supply voltage V4 steps being outputted from the power supply circuit 23 to the sub-microcomputer 22, stopping the operations of the sub-microcomputer 22. As a result, of the two microcomputers 21 and 22, only the main microcomputer 21 remains to operate without rest.

The main microcomputer 21 then determines that the main microcomputer 21 itself does not need to operate any more, when a condition is detected where no signal comes in from the switches, no communication signal is transmitted with the ECUs 8-10, and writing data of the learned values and the failure diagnosis results into the external storage unit 24 has completed. If such a determination is made at a time instant t10, the main microcomputer 21 stops to output the main-microcomputer power control signal C1 to the power supply circuit 23, whereby the operation mode of the regulator 51 in the power supply circuit 23 is made to shift from the high-power output mode to the low-power output mode. At the same time, the main microcomputer 21 changes its operation mode itself from the normal operation mode to the waiting mode which is identical to a substantial operation stop. Hence, the ECU 1 returns to its initial waiting state realized immediately after the battery voltage V1 is put on.

On the other hand, in the ECU 1, the main-microcomputer operation monitor 37 incorporated in the main microcomputer 21 is configured to reset the main microcomputer 21, unless reset to this monitor 37 is made by the CPU 31 at intervals falling into a predetermined period of time. That is, this monitor 37 has the function of a watch dog timer. This main-microcomputer operation monitor 37 operates only when the main-microcomputer power control signal C1 is outputted from the main microcomputer 21 to the power supply circuit 23, as shown in FIG. 3 (refer to the second column from the bottom). Hence, in the waiting mode in which the main microcomputer 21 stops its operations, it will not be erroneously determined through the operation monitor that the main microcomputer 21 is malfunctioning.

The main microcomputer 21 also functionally includes the sub-microcomputer operation monitor 31b, which is realized when the CPU 31 executes a given program. This monitor 31b outputs the reset signal C3 to the sub-microcomputer 22, unless its timer count is reset by the watch dog clear signal WDC from the sub-microcomputer 22 at intervals falling into a predetermined period of time. That is, the monitor 31b also functions as a watch dog timer. This monitor 31b functions only in a state where, as shown in the bottom of FIG. 3, the sub-microcomputer power control signal C2 is outputted from the main microcomputer 21 to the power supply circuit 23. Hence, when the power supply voltage V4 is not supplied to the sub-microcomputer 22, that is, when the sub-microcomputer 22 is not in operation, the operation monitor will not provide the risk of erroneously determining that the sub-microcomputer 22 is malfunctioning.

The CPU 31 of the main microcomputer 21 decides that the sub-microcomputer 22 has been brought into an abnormal state which is impossible to return to the normal state by resetting its operations, in is cases where the sub-microcomputer operation monitor 31b has the reset signal C3 sent to the sub-microcomputer 22 a predetermined number of times or more within a specific period of time. In such a case, the output of the sub-microcomputer power control signal C2 is stopped regardless of being the power supply voltage V2 and the power cutoff allowing signal C4. It is therefore possible to cut off the supply of the power to the sub-microcomputer 22 in the case where the sub-microcomputer 22 does not return to its normal state even by repeating resetting the sub-microcomputer 22. Hence, the sub-microcomputer 22 is completely prevented from failing in its operations, thereby improving reliability in controlling the motive power and run of the vehicle.

In this way, in the present ECU 1, the three states can be provided, which are composed of the waiting state in which both of the main and sub microcomputers 21 and 22 are not in operation, the state in which only the main microcomputer 21 is in operation, and the state in which both of the main and sub microcomputers 21 and 22 are in operation. Hence, depending on the vehicle states, only necessary microcomputer(s) can be operated, thus effectively consuming the power, thus decreasing the power consumption as a whole. For example, it is frequent that the main microcomputer 21 is activated in response to reception of various input signals, but it is not needed to activate the sub-microcomputer 22, and then the main microcomputer 21 can be returned to the initial waiting mode. In this case, the sub-microcomputer 22 is not activated, avoiding the power from being over-consumed. In addition, while only the main microcomputer 21 is in operation, the power supply V1 is not supplied to the in sub-microcomputer 22. Hence, it can be avoided that the sub-microcomputer 22 consumes the power uselessly, thus improving the power consumption.

In the present embodiment, the main microcomputer 21 is able to control the foregoing three states. Therefore it is not needed to install a separate circuit to not only detect that the activation condition has been met but also activate the main microcomputer 21. This makes the apparatus compact in size.

Incidentally, the present embodiment adopts the main microcomputer 21 which is operable on the power supply voltage lower than that needed for the sub-microcomputer 22. Hence, even when the battery voltage V1 is lowered to reduce the power supply voltages V3 and V4 below the specific voltage 5V, it is avoidable that the main microcomputer 21 is brought into an inoperative state earlier than that of the sub-microcomputer 22. This means that the minimum operating voltage of the present ECU 1 can be raised.

In the ECU 1 according to the present embodiment, when the main microcomputer 21 is in the waiting mode, the regulator 51 of the power supply circuit 23 keeps the low-power output mode, thus reducing the power consumed by the regulator 51.

The main microcomputer 21 monitors the operations of the sub-microcomputer 22. This makes it possible that, as stated, when the sub-microcomputer 22 is malfunctioning, the main microcomputer 21 stops the output of the sub-microcomputer power control signal C2 to cutoff the power supply to the sub-microcomputer 22. This leads to a higher failsafe performance. An additional advantage in this case is to avoid the power from being consumed uselessly by the sub-microcomputer 22 which is in the malfunctioning state.

The main microcomputer 21 monitors the power supply voltage V2 fed to the travel-system ECUs 5-7 controlled by the sub-microcomputer 22 and outputs the control signal C2 provided that the power supply voltage V2 is equal to or higher than the threshold Vth1 for the given period of time. Hence, after the travel-system ECUs 5-7 have been powered with the power supply voltage V2, the sub-microcomputer 22 can be powered with the power supply voltage V4. Moreover, the main microcomputer 21 stops the output of the sub-microcomputer power control signal C2 provided that the power supply voltage V2 is equal to or less than the threshold Vth2 for the given period of time. It is therefore possible to give the operating period to the sub-microcomputer 22. It is also possible to avoid the power supply to the sub-microcomputer 22 to be cutoff erroneously, even if the power supply voltage V2 is instantaneously cutoff during a period of time shorter than the foregoing given period of time.

Moreover, only when receiving the power cutoff allowing signal C4 from the sub-microcomputer 22, the main microcomputer 21 stops the output of the power control signal C2. It is thus possible to securely prevent the power from being supplied erroneously to the sub-microcomputer 22 during an operating period of the sub-microcomputer 22.

Further, the signal line routing from the sub-microcomputer's output port for the power cutoff allowing signal C4 to the main microcomputer 21 is pulled, through the resistor 60, up to the high level corresponding to a non-active level. Hence, if a temporal runaway occurs in the sub-microcomputer 22 such that the output port of the sub-microcomputer 22 has a high impedance, the power cutoff allowing signal C4 to the main microcomputer 21 is kept at the high level, whereby the power supply to the sub-microcomputer 22 cannot be cutoff. In such a case, resetting the sub-microcomputer 22 may return the sub-microcomputer 22 to its normal state.

In the power supply circuit 23 according to the present embodiment, the regulator 51 composes the first power supply means and the switch 52 composes the second power supply means. The main microcomputer operation monitor 37 in the main microcomputer 21 composes the monitoring means. The travel-system ECUs 5-7 are on-vehicle devices to be controlled by the sub-microcomputer 22.

The power cutoff allowing signal C4 from the sub-microcomputer 22 may be transmitted serially to the main microcomputer 21 via an internal communication line. In this example, during a malfunction occurring in the communication between the main and sub microcomputers 21 and 22, the sub-microcomputer power control signal C2 is stopped from being outputted. Hence, even if a temporary runaway occurs in the sub-microcomputer 22 to cause the communication malfunction, it is possible to prevent the power supplied to the sub-microcomputer 22 from being cut off. In this case, resetting the sub-microcomputer 22 may return the sub-microcomputer 22 to its normal state.

Second Embodiment

Figure 4:
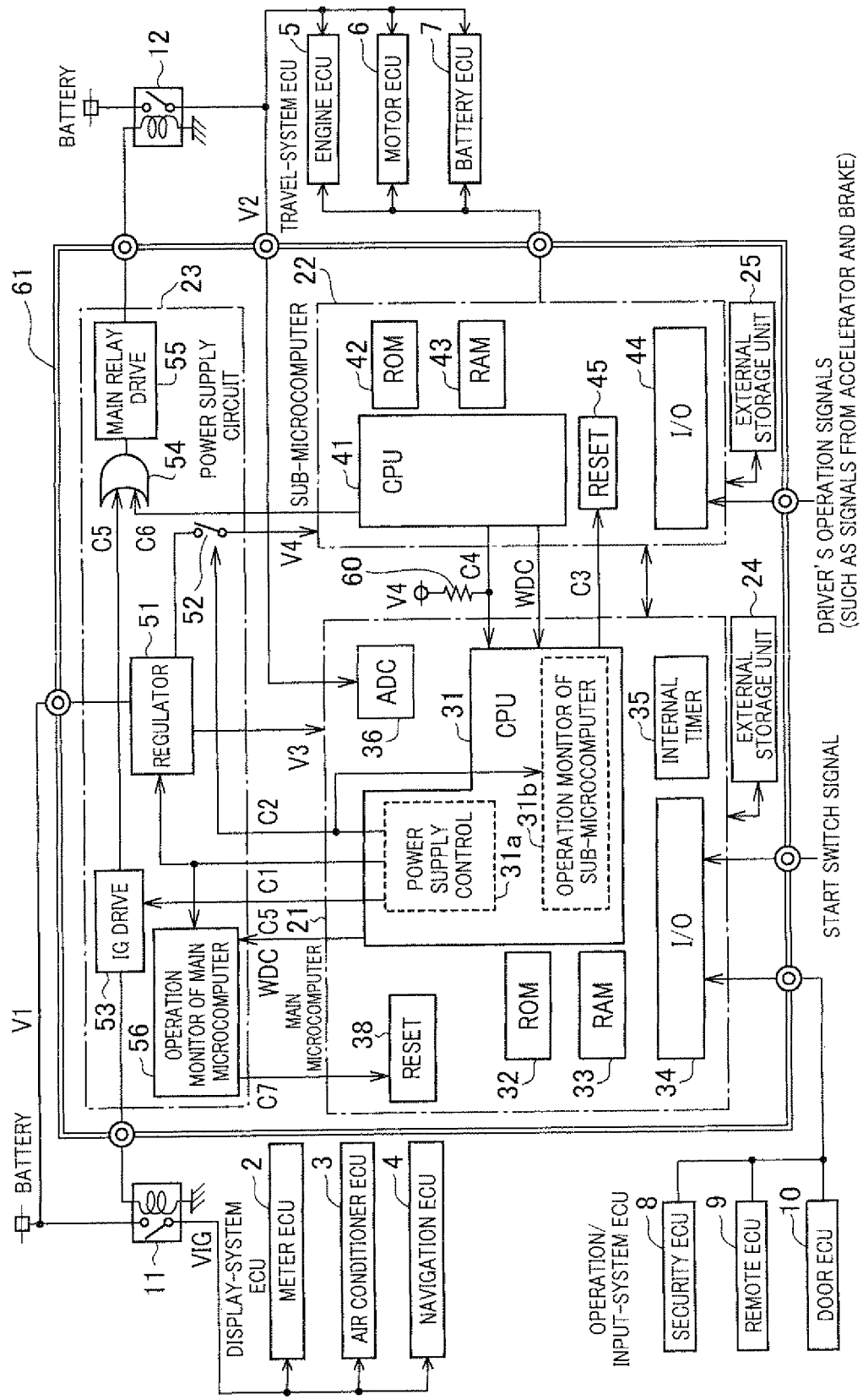
FIG. 4 is a block diagram showing the configuration of an electronic control apparatus (practically, an ECU) for vehicles, according to a second embodiment of the present invention.

Referring to FIG. 4, a second embodiment of the present invention will now be described. Incidentally, in the present and succeeding embodiments, for the sake of a simplified description, the components identical or similar to those used in the first embodiment will be given the same reference numerals to avoid redundant descriptions.

FIG. 4 shows the configuration of an ECU 61 according to the second embodiment, which composes one aspect of the electronic control apparatus of the present invention.

The present ECU 61 is identical in construction to the ECU 1 in the first embodiment except for the following components.

First of all, in place of the main microcomputer operation monitor 37 in the main microcomputer 21, there is a reset circuit 38 to reset the main microcomputer 21 in response to receiving a reset signal C7 from the power supply circuit 23.

Instead, in the power supply circuit 23, there is provided a main microcomputer operation monitor 56 which is identical in function to the monitor 37 used in the first embodiment.

The main microcomputer operation monitor 56 is a watch dog timer that is operable only during a period of time in which the main-microcomputer power control signal C1 is outputted from the main microcomputer 21 to the power supply circuit 23. When not being reset by the watch dog clear signal WDC coming from the main microcomputer 21 within a predetermined period of time, this monitor 56 outputs the reset signal C7 to the main microcomputer 21. The watch dog clear signal WDC is outputted when the CPU 31 of the main microcomputer 21 regularly executes a specific command in a given program.

In this way, in the ECU 61 according to the second embodiment, the main microcomputer operation monitor 56 is put outside the main microcomputer 21. Hence, a malfunction occurring in the main microcomputer 21 will not influence the monitoring functions to the main microcomputer 21, raising reliability for the operations of ECU 61.

Third Embodiment

Figure 5:
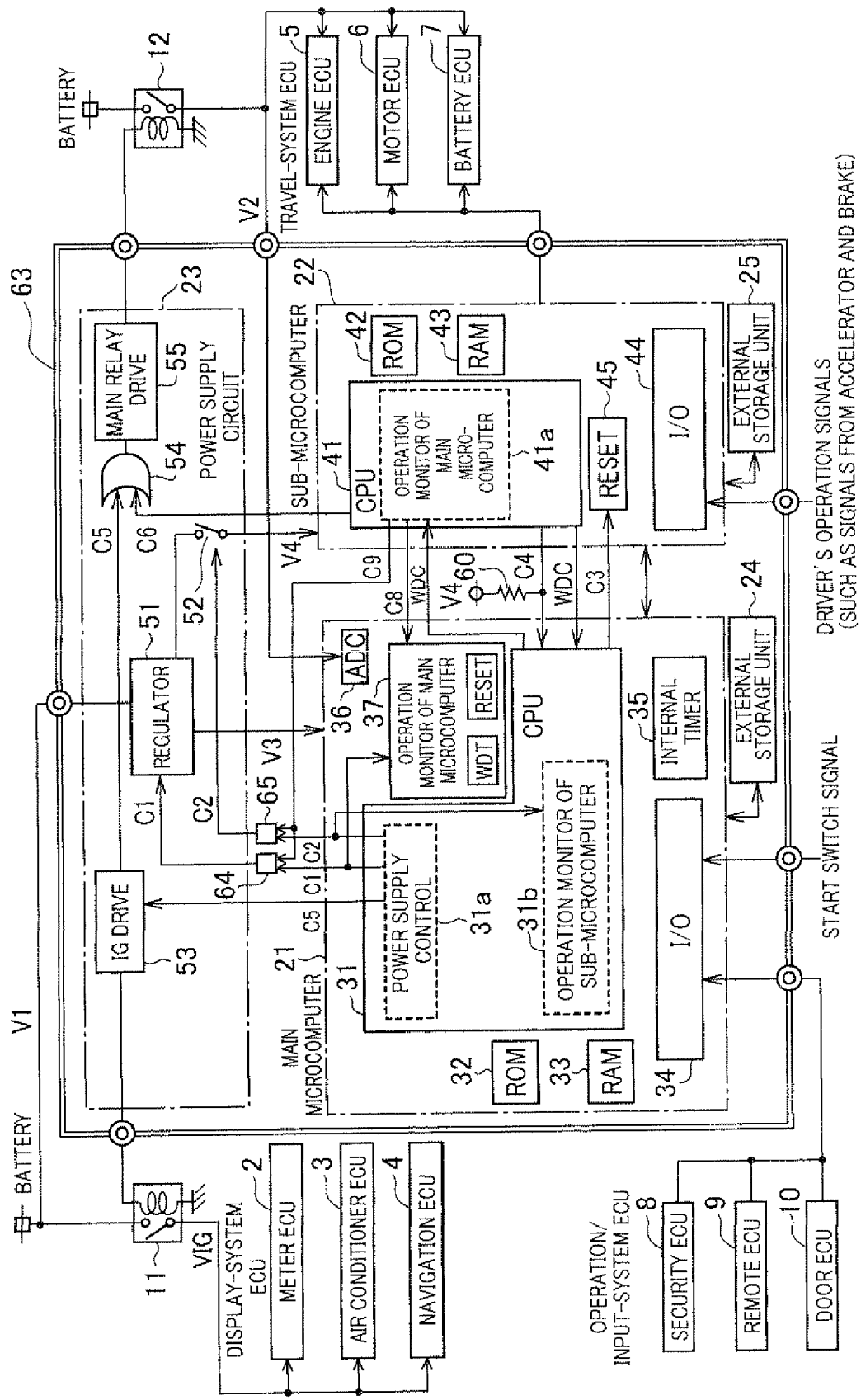
FIG. 5 is a block diagram showing the configuration of an electronic control apparatus (practically, an ECU) for vehicles, according to a third embodiment of the present invention.

Referring to FIG. 5, a second embodiment of the present invention will now be described.

FIG. 5 shows the configuration of an ECU 63 according to the third embodiment, which composes one aspect of the electronic control apparatus of the present invention.

The present ECU 63 is identical in construction to the ECU 1 in the first embodiment except for the following components.

The sub-microcomputer 22 is provided with a main microcomputer operation monitor 41a to see if the main microcomputer 21 is in normal operation. This operation monitor 41a is functionally realized by the CPU 41 which executes a given program for the monitoring work.

The main microcomputer operation monitor 41a in the sub-microcomputer 22 is also produced as a watch dog timer, which outputs a reset signal C8 to the main microcomputer 21 whenever the timer count is not reset regularly by the watch dog clear signal WDC from the main microcomputer 21 at intervals which are set within a given period of time.

In the main microcomputer 21, the CPU 31 regularly executes a specific command in a given program, so that the watch dog clear signal WDC is outputted regularly to the sub-microcomputer 22 during the given period of time. In addition, in response to reception of the reset signal C8 from the sub-microcomputer 22, the main microcomputer operation monitor 37 will set the operations of the main microcomputer 21.

When a malfunction occurring in the main microcomputer 21 is detected, the main microcomputer operation monitor 41a, which is in the sub-microcomputer 22, notifies the other devices (such as ECUs 5-7) arranged outside of the ECU 63 of the occurrence of the malfunction. At the same time, the operation monitor 41a stores the occurrence of the malfunction into the external storage unit 25 as a history.

Further, the main microcomputer operation monitor 41a may provide the main microcomputer 21 with the reset signal C8 a given number of times or more within a given period of time. In such a case, it is determined that the main microcomputer 21 is malfunctioning but can be returned to its normal state by a reset operation, and the operation monitor 41a outputs a power stop signal C9. This power stop signal C9 is a high-active high/low binary signal.

Two logical circuits 64 and 65 are added on the lines for the power control signals C1 and C2 from the main microcomputer 21 to the power supply circuit 23, respectively.

One of the logical circuits, 64, responds to a low-to-high transition of the main-microcomputer power control signal by outputting the high-level control signal C1 to the power supply circuit 23. Then, when a high-to-low transition occurs in this power control signal C1 coming from the main microcomputer 21 or a low-to-high transition occurs in the power stop signal C9 coming from the sub-microcomputer 22, the local circuit 64 changes the power control signal C1 from the high level to the low level.

Similarly, the other logical circuit 65 responds to a low-to-high transition of the sub-microcomputer power control signal C2 coming from the main microcomputer 21 by outputting to the power supply circuit 23 the high-level power control signal C2. Then this logical circuit 65 changes the power control signal C2 from the high to the low, when the power control signal becomes low or the power stop signal C9 becomes high.

Hence, in cases where there occurs a malfunction in the main microcomputer 21 so that the power stop signal C9 is outputted from the sub-microcomputer 22, the power supply voltages V3 and V4 are forcibly stopped from being supplied to the microcomputers 21 and 22. In detail, it can be explained such that, as to the power supply voltage V3, the amount of power being outputted decreases down to an amount that is able to make the main microcomputer 21 inoperative in a state where its normal state is kept.

In this ECU 63, the sub-microcomputer 22 is able to examine how the normally-operating main microcomputer 21 manages the power supply and monitors the operations. Accordingly, the apparatus is given higher control reliability.

Moreover, the main microcomputer 21 may be brought into an abnormal state which cannot be returned to the normal state even by being reset. In such a case, the power supply to both microcomputers 21 and 22 is forced to stop. It is therefore possible to avoid a situation where a malfunction occurring in the main microcomputer 21 disturbs an appropriate management of the power consumption in the ECU 63 so that the battery is uselessly weakened.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

For example, the sub-microcomputer 22 may be two or more in number.

The construction for determining the activation condition may also be modified. In each of the foregoing embodiments, while the main microcomputer 21 is in the waiting mode, the activation condition is determined. That is, the main microcomputer 21 is provided with the activation circuit detecting the activation condition to output the power supply circuit 23 with the main-microcomputer power control signal C1 and activating the main microcomputer 21. However this is not a definitive way, but the activation circuit may be installed separately from the main microcomputer 21, raising the degree of freedom in designing the apparatus. Meanwhile, the apparatus according to the foregoing embodiments can still enjoy the compactness of the apparatus.

What is claimed is:

1. An electronic control apparatus for vehicles, comprising
a main microcomputer which is activated when a given activation condition is met;
a sub-microcomputer to which power supply voltage is supplied based on a power control signal controlling power supply to the sub-microcomputer, the power control signal being outputted by the main microcomputer;
a first power supply unit that supplies, via a first supply line, power supply voltage to the main microcomputer to activate the main microcomputer; and
a second power supply unit that supplies, via a second supply line different from the first supply line, power supply voltage to the sub-microcomputer to activate the sub-microcomputer, when the second power supply unit receives the power control signal from the main microcomputer, wherein
the main microcomputer includes determining means for determining whether or not the sub-microcomputer should be made to operate and switching means for performing a switchover between output and non-output of the power control signal to the second power supply unit based on results of the determining means whereby the power supply to the sub-microcomputer is controlled;
the first power supply unit includes
means for receiving a further power control signal controlling power supply to the main microcomputer and
means for switching an operation mode of an operating power supply voltage to the main microcomputer from a low-power output mode enabling a small amount of power to be outputted to a high-power output mode enabling a high amount of power to be outputted higher than the small amount of power; and
the main microcomputer includes means for operating in a waiting mode with power consumed less than in a normal operation mode of the main microcomputer, depending on the operating power supply voltage from the first power supply unit operating in the low-power output mode, until the determining means determines that an activation condition has been met, and
means for outputting the further power control signal to the first power supply unit when it is determined that the activation condition has been met in the waiting mode, allowing the first power supply unit to transit from the waiting mode the normal operation mode.

2. The apparatus of claim 1, wherein the main microcomputer is operable on a power supply voltage lower than a power supply voltage on which the sub-microcomputer is operable.

3. The apparatus of claim 2, wherein the main microcomputer includes monitoring means for monitoring whether or not the sub-microcomputer is in operation in a normal state thereof.

4. The apparatus of claim 3, wherein the monitoring means in the main microcomputer is configured to monitor operation of the sub-microcomputer while the power control signal is supplied to the second power supply unit.

5. The apparatus of claim 1, wherein the main microcomputer includes monitoring means for monitoring whether or not the sub-microcomputer is in operation in a normal state thereof.

6. The apparatus of claim 5, wherein the monitoring means in the main microcomputer is configured to monitor an operation of the sub-microcomputer while the power control signal is supplied to the second power supply unit.

7. The apparatus of claim 1, comprising
monitoring means for monitoring whether or not the main microcomputer is in operation in a normal state thereof,
wherein the monitoring means is configured to monitor an operation of the main microcomputer while the main microcomputer detects the activation thereof.

8. The apparatus of claim 7, wherein the monitoring means is placed separately from the main microcomputer.

9. The apparatus of claim 1, wherein
the main microcomputer includes means for monitoring power supply voltage to on-vehicle devices which are controlled by the apparatus, and
means for outputting the power control signal on condition that the monitored power supply voltage to the on-vehicle devices is continuously equal to or higher than a given amount for a predetermined period of time or more.

10. The apparatus of claim 9, wherein the main microcomputer includes means for commanding the power control signal to stop on condition that the monitored power supply voltage is continuously equal to or less than a given amount for a predetermined period of time or more.

11. The apparatus of claim 1, wherein
the sub-microcomputer includes
further determining means for determining whether or not the sub-microcomputer is able to stop an operation thereof, and
means for outputting a power cutoff allowing signal to the main microcomputer, and
the main microcomputer includes
means for stopping the output of the power control signal in response to reception of the power cutoff allowing signal from the sub-microcomputer.

12. The apparatus of claim 11, wherein
the main microcomputer includes
means for determining the sub-microcomputer is malfunctioning so as to be impossible to return to a normal operation state thereof, and
means for stopping the output of the power control signal regardless of reception of the power cutoff allowing signal, provided that it is determined that the sub-microcomputer is malfunctioning so as to be impossible to return to the normal operation state thereof.

13. The apparatus of claim 1, wherein
the power cutoff allowing signal is a signal outputted from an output port of the sub-microcomputer, the output port being connected to the main microcomputer via a signal line electrically pulled up to a voltage indicating non-allowance of cutting off the power supply.

14. The apparatus of claim 13, wherein
the power cutoff allowing signal is a signal transmitted from the sub-microcomputer to the main microcomputer using serial communication and
the main microcomputer includes means for allowing the output of the power control signal when a malfunction occurs in communication with the sub-microcomputer.

15. The apparatus of claim 1, wherein
the sub-microcomputer includes monitoring means for monitoring whether or not the main microcomputer is in a normal operation.

16. The apparatus of claim 15, wherein
the sub-microcomputer includes means for stopping the output of the operating power supply voltages to the first and second power supply units, when it is determined that the main microcomputer is malfunctioning so as to be impossible to return to a normal operation state thereof based on monitored results of the monitoring means.

17. The apparatus of claim 1, wherein the main microcomputer includes monitoring means for monitoring whether or not the sub-microcomputer is in operation in a normal state thereof.

18. The apparatus of claim 17, wherein the monitoring means in the main microcomputer is configured to monitor operation of the sub-microcomputer while the power control signal is supplied to the second power supply unit.

19. The apparatus of claim 1, wherein
the main microcomputer is activated when the given activation condition that a signal is sent from an operation/input-system electronic control unit (ECU) or a start switch signal changes to its active level is met.

20. The apparatus of claim 1, wherein
the main microcomputer is configured to decide that the sub-microcomputer should start if power supply voltage to a travel-system electronic control unit (ECU) is continuously equal to or higher than a given threshold for a given period of time.

21. The apparatus of claim 1, wherein
the apparatus is able to receive a start switch signal indicting on/off states of a push type of start switch operated by a driver to command a start/stop of an ignition-system power supply and a start of an engine of the vehicle.

* * * * *